(12) United States Patent
Lahnala

(10) Patent No.: US 8,595,981 B2
(45) Date of Patent: Dec. 3, 2013

(54) SLIDING WINDOW ASSEMBLY

(75) Inventor: David W. Lahnala, Adrian, MI (US)

(73) Assignee: AGC Automotive Americas Co., Alpharetta, GA (US)

( * ) Notice: Subject to any disclaimer, the term of this patent is extended or adjusted under 35 U.S.C. 154(b) by 53 days.

(21) Appl. No.: 13/289,511

(22) Filed: Nov. 4, 2011

(65) Prior Publication Data

US 2012/0110915 A1    May 10, 2012

Related U.S. Application Data

(60) Provisional application No. 61/410,531, filed on Nov. 5, 2010.

(51) Int. Cl.
*B60J 1/18* (2006.01)
*B60J 10/04* (2006.01)

(52) U.S. Cl.
USPC .............................................. 49/413; 49/380

(58) Field of Classification Search
USPC ............................. 49/380, 413, 116; 206/325
See application file for complete search history.

(56) References Cited

U.S. PATENT DOCUMENTS

| | | | |
|---|---|---|---|
| 4,124,054 A | | 11/1978 | Spretnjak |
| 4,920,698 A | | 5/1990 | Friese et al. |
| 5,505,023 A | * | 4/1996 | Gillen et al. ................... 49/380 |
| 5,522,191 A | * | 6/1996 | Wenner et al. ............. 52/204.51 |
| 5,613,323 A | * | 3/1997 | Buening ......................... 49/380 |
| 5,799,444 A | * | 9/1998 | Freimark et al. ................ 49/413 |
| 5,822,922 A | * | 10/1998 | Grumm et al. .................. 49/360 |
| 5,996,284 A | * | 12/1999 | Freimark et al. ................ 49/209 |
| 6,014,840 A | * | 1/2000 | Ray et al. ......................... 49/413 |
| 6,018,913 A | | 2/2000 | Lin |
| 6,023,888 A | | 2/2000 | Dover |
| 6,286,891 B1 | * | 9/2001 | Gage et al. ..................... 296/166 |
| 6,591,552 B1 | * | 7/2003 | Rasmussen ..................... 49/413 |
| 6,766,617 B2 | * | 7/2004 | Purcell ............................. 49/360 |
| 6,955,009 B2 | * | 10/2005 | Rasmussen ..................... 49/413 |
| 7,003,916 B2 | | 2/2006 | Nestell et al. |
| 7,021,006 B2 | * | 4/2006 | Farrar et al. ..................... 49/375 |
| 7,025,405 B2 | | 4/2006 | Gillen |
| 7,073,293 B2 | * | 7/2006 | Galer .............................. 49/413 |
| 7,155,862 B2 | * | 1/2007 | Bourque et al. ................ 49/413 |
| 7,155,863 B2 | | 1/2007 | Daniel et al. |
| 7,185,458 B2 | * | 3/2007 | Bourque et al. ................ 49/413 |
| 7,395,631 B2 | * | 7/2008 | Lahnala ........................... 49/213 |
| 7,464,501 B2 | | 12/2008 | Arimoto et al. |
| RE40,636 E | * | 2/2009 | Weinert et al. ........... 296/146.16 |
| 7,584,574 B2 | | 9/2009 | Kinross et al. |

(Continued)

*Primary Examiner* — Katherine Mitchell
*Assistant Examiner* — Justin Rephann
(74) *Attorney, Agent, or Firm* — Howard & Howard Attorneys PLLC

(57) ABSTRACT

A sliding window assembly for a vehicle including a first fixed panel and a second fixed panel spaced a distance from the first fixed panel to define an aperture therebetween. A sliding panel is movable relative to the fixed panels between a closed position and an open position. The sliding panel includes a top end and a bottom end spaced from the top end. A track is coupled to the fixed panels with a central section of the track spanning the aperture. The track defines a channel for receiving the top or bottom end of the sliding panel. The central section of the track defines a notch having a width substantially equal to or greater than the distance between the fixed panels for revealing either the top end or the bottom end of the sliding panel within the channel of the track between the first and second fixed panels.

17 Claims, 7 Drawing Sheets

(56) References Cited

U.S. PATENT DOCUMENTS

| | | |
|---|---|---|
| 7,641,265 B2 | 1/2010 | Seiple et al. |
| 7,673,419 B2 | 3/2010 | Arimoto |
| 7,810,284 B2 * | 10/2010 | Murphy et al. ............ 49/380 |
| 7,934,342 B2 * | 5/2011 | Lahnala ..................... 49/380 |
| 2002/0148163 A1 | 10/2002 | Warner et al. |
| 2003/0182866 A1 * | 10/2003 | Nestell et al. ............. 49/413 |
| 2005/0150171 A1 * | 7/2005 | Lahnala ..................... 49/413 |
| 2005/0178067 A1 * | 8/2005 | Cusson et al. ............. 49/413 |
| 2006/0107599 A1 | 5/2006 | Luten |
| 2006/0107600 A1 * | 5/2006 | Nestell et al. ............. 49/413 |
| 2008/0060275 A1 | 3/2008 | Recker |
| 2008/0122262 A1 | 5/2008 | Cicala |
| 2008/0263960 A1 * | 10/2008 | Murphy et al. ............ 49/408 |
| 2009/0212591 A1 * | 8/2009 | Seiple et al. .............. 296/154 |
| 2009/0267382 A1 | 10/2009 | Smith et al. |
| 2010/0071270 A1 | 3/2010 | Seiple et al. |
| 2010/0122494 A1 * | 5/2010 | Lahnala ..................... 49/358 |
| 2010/0122496 A1 * | 5/2010 | Lahnala ..................... 49/360 |
| 2010/0122497 A1 * | 5/2010 | Lahnala ..................... 49/413 |
| 2010/0263290 A1 * | 10/2010 | Pawloski et al. .......... 49/413 |

\* cited by examiner

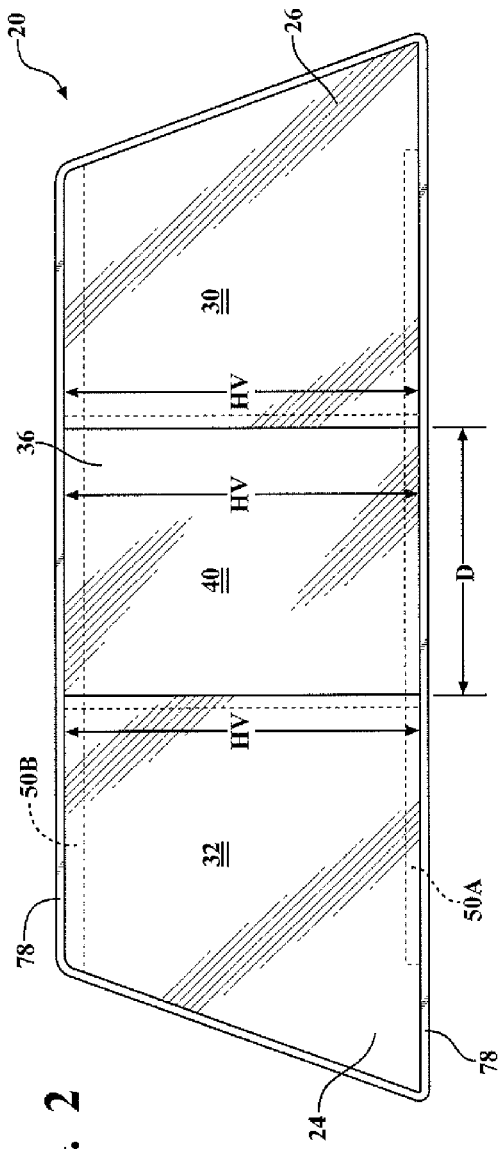
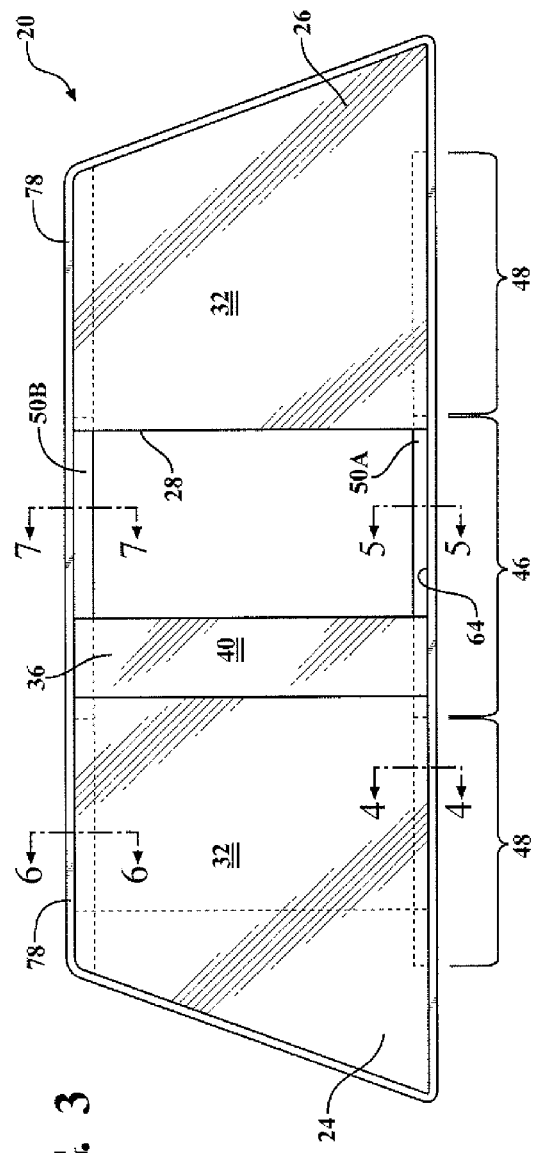
FIG. 2
FIG. 3

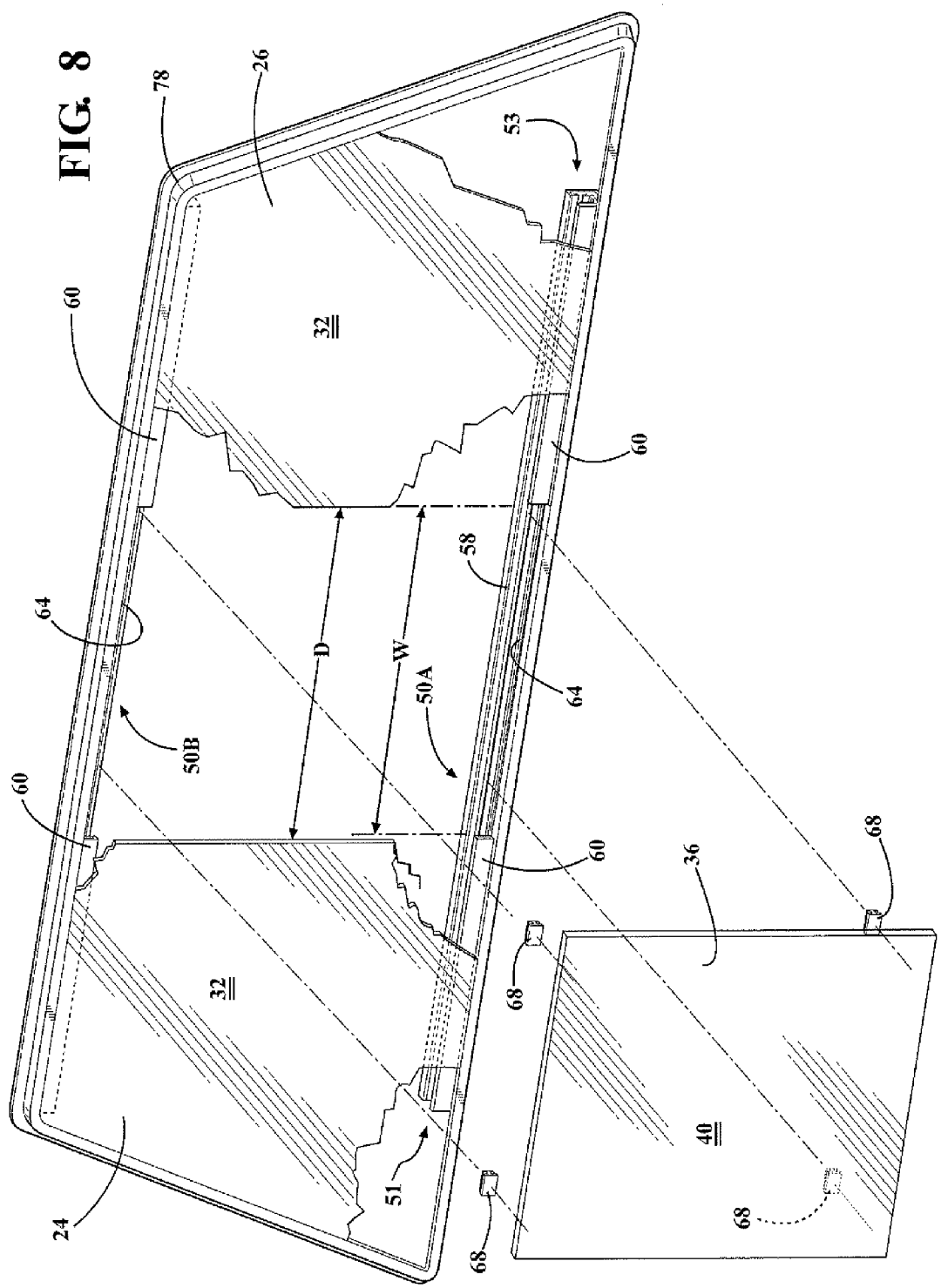

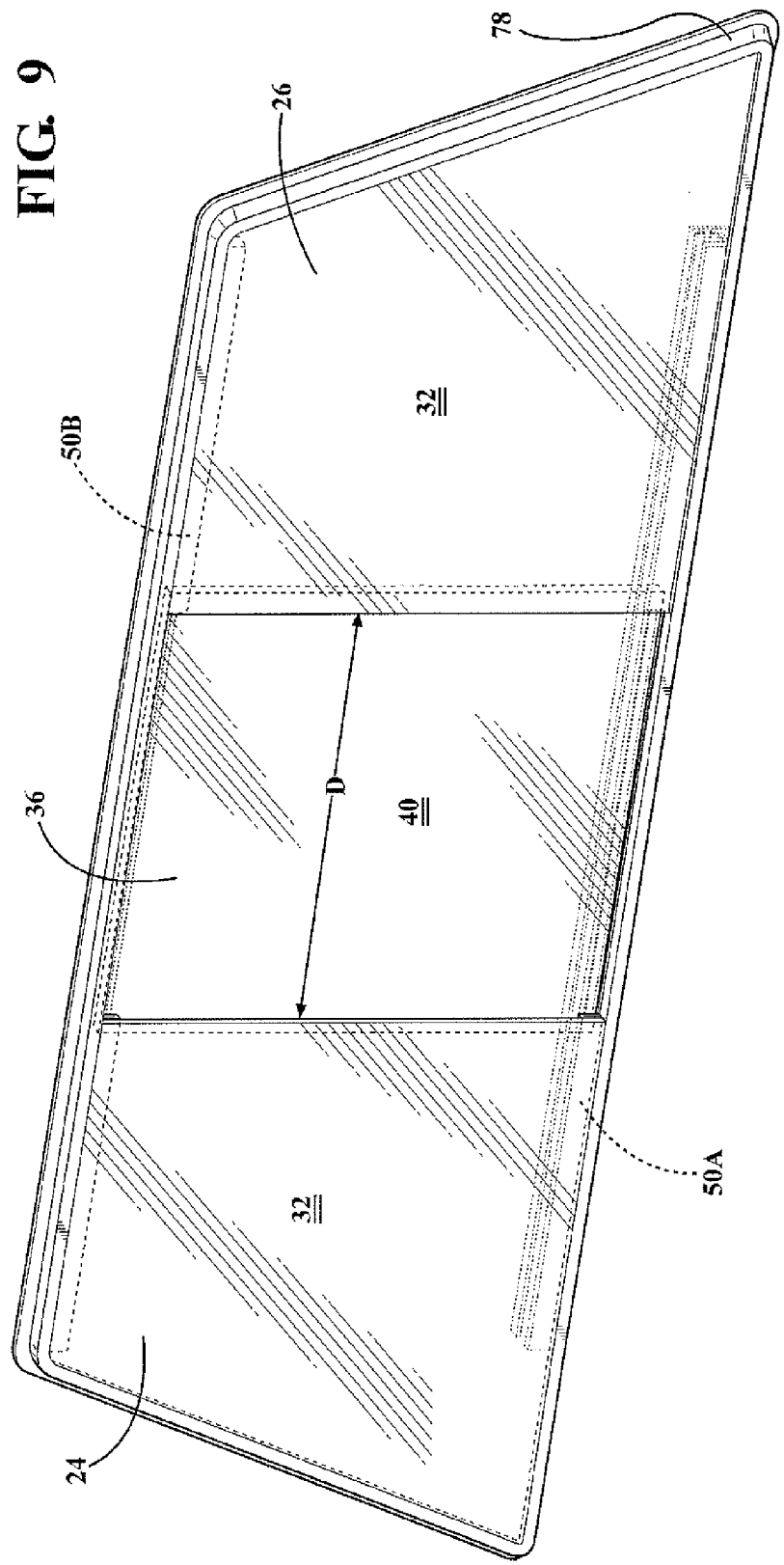

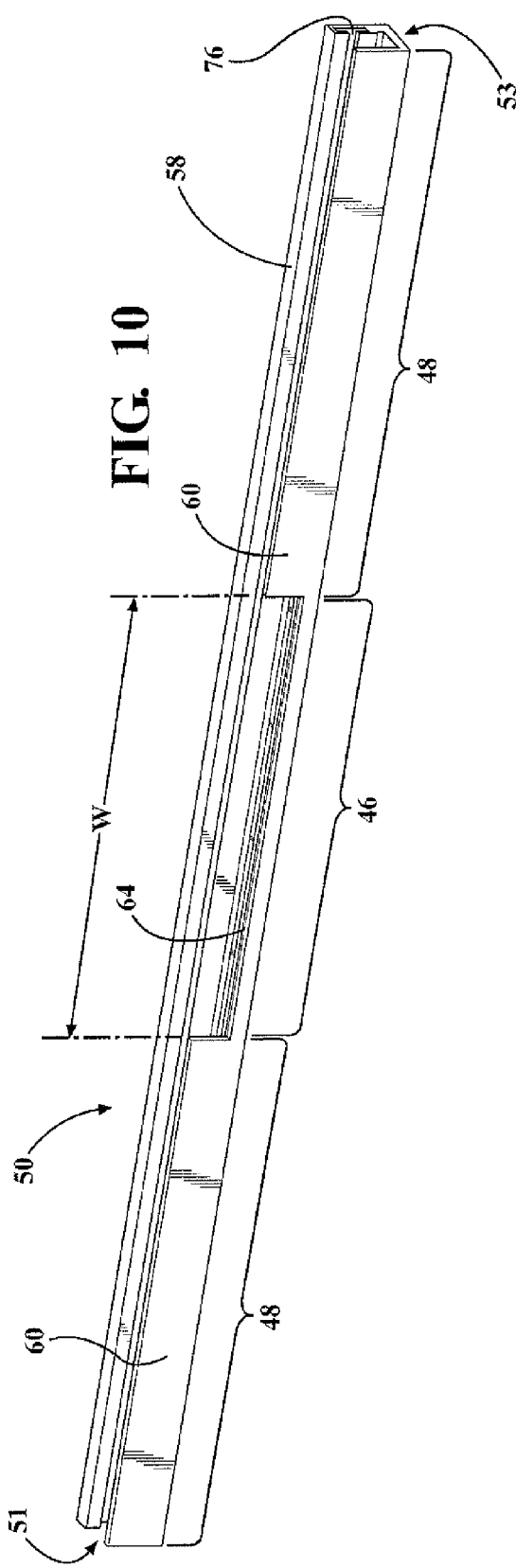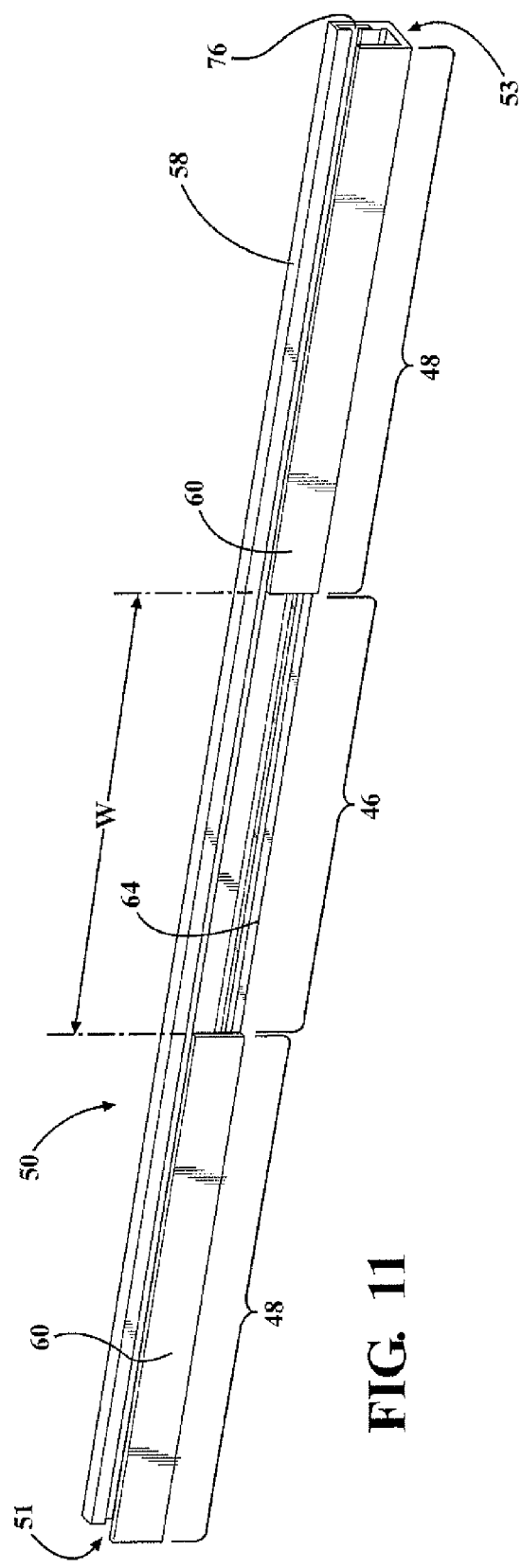

SLIDING WINDOW ASSEMBLY

RELATED APPLICATION

This application claims the benefit of U.S. Provisional Patent Application No. 61/410,531, filed on Nov. 5, 2010, which is hereby incorporated by reference in its entirety.

FIELD OF THE DISCLOSURE

The present invention generally relates to a sliding window assembly and, more specifically, the invention relates to a sliding window assembly for a vehicle.

BACKGROUND

Sliding window assemblies are known in the art. A conventional sliding window assembly for a vehicle includes a first fixed panel and a second fixed panel. Each of the first and second fixed panels are configured to be coupled to the vehicle. The first and second fixed panels are spaced from one another to define an aperture there between. A sliding panel is movable relative to the first and second fixed panels between a closed position for covering the aperture, an open position for uncovering the aperture, and an intermediate position between the open and closed positions.

The conventional sliding window assembly further includes an upper track and a lower track spaced from the upper track. Each of the tracks are coupled to the first and second fixed panels and are spaced from a periphery of the fixed panel. The sliding panel is slidable along the tracks between the open, intermediate, and closed positions. A decorative element such as a pair of decorative panels, generally known as appliqués, or encapsulation material are typically coupled to each of the lower and upper tracks within the aperture defined by the first and second fixed panels. The decorative element screens and obscures the lower and upper tracks so that the tracks are not visible, when the conventional sliding window assembly is viewed from an exterior of the vehicle. When the encapsulation material is used, it may be flush with the fixed panels or it may be recessed from the fixed panels. Because the tracks are spaced from the periphery of the fixed panels, the decorative element obscures a portion of the sliding panel. The obstruction of the sliding panel results in the sliding panel appearing to be a different height then the fixed panels when the conventional sliding window assembly is viewed from the exterior of the vehicle. The height difference between the sliding panel and the fixed panel is not aesthetically pleasing and makes the conventional sliding window assembly appear uneven. Additionally, the decorative element increases a cost to manufacture the conventional sliding window assembly. Furthermore, the decorative element reduces a viewing area through the conventional siding window assembly.

One attempt to increase the viewing area is to modify the conventional sliding window assembly with a track and pin system. The track and pin system includes a plurality of pins that are coupled to the sliding panel. A pair of tracks define intricate pathways for guiding the pins, and therefore the sliding panel, between the open and closed positions. When the sliding panel of the modified sliding window assembly is in the closed position, the sliding panel and the fixed panels appear to be the same height. However, unlike the conventional sliding window assembly described above, the tracks of the modified sliding window assembly are not coupled to the fixed panels. Instead, the tracks are each coupled to intermediate frame members, which are located above and below the fixed panels. Therefore, one of the tracks is located above the fixed panels and the other one of the tracks is located below the fixed panels. Having the tracks located above and below the fixed panels gives the modified sliding window assembly a thicker cross-section which is harder to install on the vehicle and is undesirable. Additionally, the sliding panel is never disposed within the tracks and therefore relies on the pins engagement of the tracks to secure the sliding panel within the sliding window assembly. Therefore, the sliding panel of the modified sliding window assembly is not retained as securely within the tracks as a sliding panel of the conventional sliding window assembly which uses the appliqués as described above. Additionally, manufacturing intricate pathways in the tracks can be difficult to ensure proper alignment within the sliding window assembly. If the pins are not properly aligned within the tracks, this can cause the pins to wear prematurely or even fail, requiring that the sliding window assembly be replaced.

Another attempt to increase the viewing area is to modify the conventional sliding window assembly by utilizing a single fixed panel to replace the first and second fixed panels. The single fixed panel defines the aperture therein such that the single fixed panel surrounds the aperture on all sides of the aperture. Because the single fixed panel defines the aperture, there is a glass segment above and below the sliding panel adjacent the aperture. The glass segment covers a portion of the sliding panel such that the sliding panel does not appear to be the same height as the fixed panel, i.e., the sliding panel and the fixed panels do not appear to have a common glass height when viewed from an exterior of the vehicle. Typically, the aperture is formed through complex manufacturing techniques, such as, by drilling and/or cutting through the single fixed panel of the sliding window assembly. However, drilling and/or cutting through the single fixed panel of the sliding window assembly is difficult and the single fixed panel tends to break, resulting in scrapped single fixed panels and thus increased cost to produce the single fixed panel. The step of drilling and/or cutting also increases the cost to produce the single fixed panel compared to sliding window assemblies utilizing two fixed panels to define the aperture.

Additionally, the utilization of either the decorative element or the single fixed panel, as described above, prevents the sliding panel and the fixed panels from having the common glass height when the sliding window assembly is viewed from the exterior of the vehicle. More specifically, the decorative element or the glass segment each result in a visible horizontal style line, which are not aligned with style lines between the fixed panels and the vehicle. Therefore, the visible horizontal style line of the decorative element or the glass segment breaks up the height of the sliding panel. As such, the visible horizontal style line prevents the sliding panel and the fixed panel from appearing to have the common glass height. Therefore, there remains an opportunity to design an improved sliding window assembly.

SUMMARY AND ADVANTAGES

The present disclosure provides a sliding window assembly for a vehicle. The sliding window assembly includes a first fixed panel and a second fixed panel spaced a distance from the first fixed panel. Spacing the second fixed panel from the first fixed panel defines an aperture between the first and second fixed panels. A sliding panel is movable relative to the fixed panels between a closed position for covering the aperture and an open position for uncovering the aperture. The sliding panel includes a top end and a bottom end spaced from the top end. A track is coupled to the fixed panels with a central section of the track spanning the aperture. The track defines a channel for receiving either the top end or the bottom end of the sliding panel. The central section of the track defines a notch having a width substantially equal to or greater than the distance between the first and second fixed panels for revealing either the top end or the bottom end of the sliding panel within the channel of the track between the first and second fixed panels.

Accordingly, the present disclosure provides a sliding window assembly free of decorative elements and/or glass segments that screen and obscure the tracks. By eliminating the decorative elements and/or the glass segments, there are no visible horizontal style lines that are offset from style lines between the fixed panels and the vehicle. Therefore, the sliding panel appears to have a common glass height with the fixed panels and therefore the sliding window assembly is more aesthetically pleasing. Costs can be reduced because the decorative elements are eliminated and manufacturing techniques may be simplified. For example, both the cost to install as well as the cost of the decorative element itself may be saved by utilizing the sliding window assembly of the present disclosure. Additionally, eliminating the need to cut through the fixed panel will greatly reduce manufacturing time and complexity, as well as significantly reducing the amount of scrapped fixed panels. Still further, the viewing area through the sliding window assembly is maximized because there is not a decorative element obscuring the viewing area.

BRIEF DESCRIPTION OF THE DRAWINGS

Advantages of the present invention will be readily appreciated, as the same becomes better understood by reference to the following detailed description, when considered in connection with the accompanying drawings.

FIG. 2 is a plan view of the sliding window assembly with a sliding panel in a closed position.

FIG. 3 is a plan view of the sliding window assembly with the sliding panel in an open position.

FIG. 8 is a partially exploder perspective view of the sliding window assembly.

FIG. 9 is a perspective view of the sliding window assembly with the sliding panel in the closed position.

FIG. 10 is a perspective view of a first embodiment of the track of the sliding window.

FIG. 11 is a perspective view of a second embodiment of the track of the sliding window assembly.

DETAILED DESCRIPTION

Figure 1:
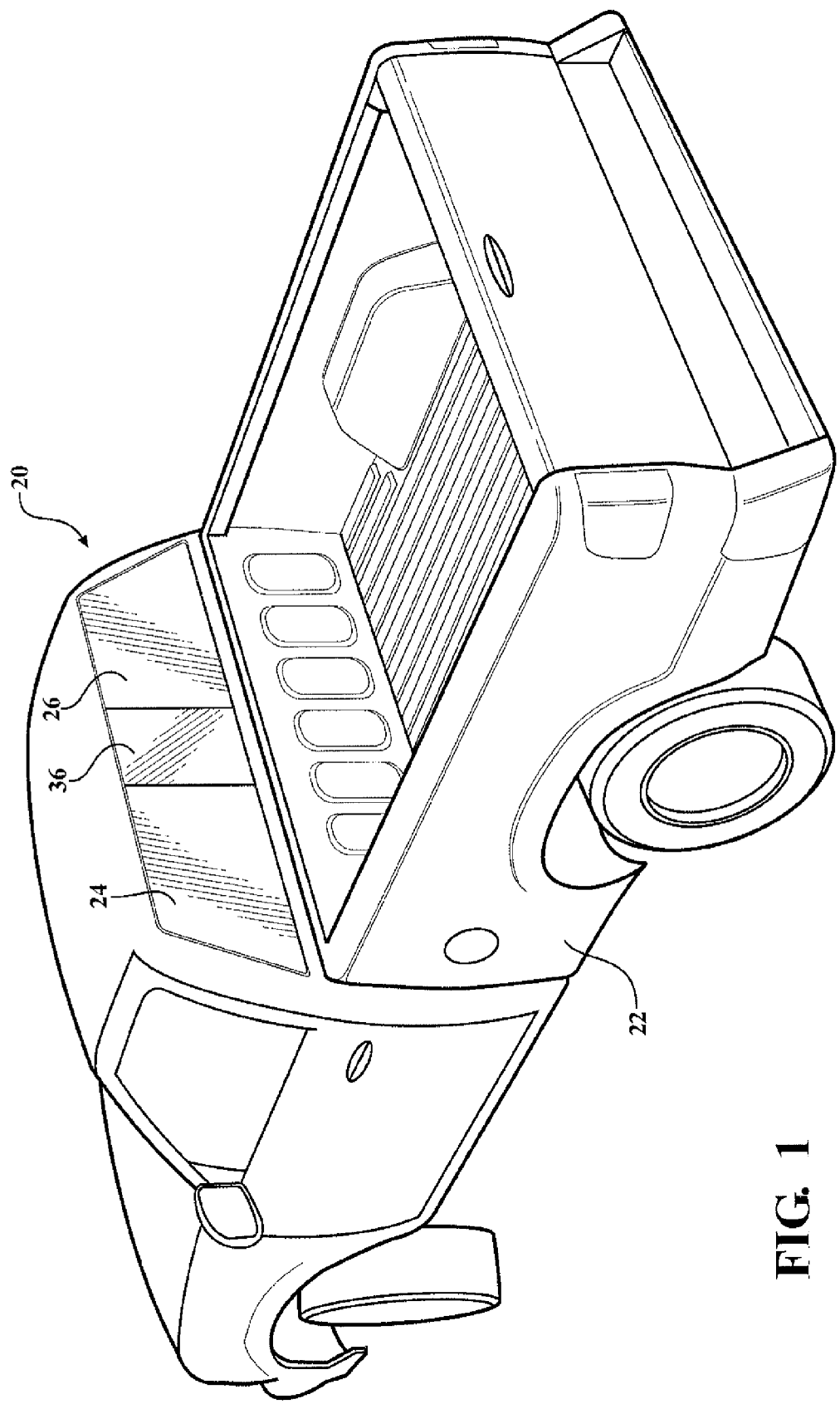
FIG. 1 is a perspective view of a vehicle including a sliding window assembly.

With reference to the Figures, wherein like numerals indicate like or corresponding parts throughout the several views, a sliding window assembly is generally shown at 20. Typically, the sliding window assembly 20 is coupled to a vehicle 22. With reference to FIG. 1, the sliding window assembly 20 is shown as a rear window for a pickup truck. However, it is to be appreciated that the sliding window assembly 20 is not particularly limited and may be implemented on other types of vehicles as well as in non-vehicle applications. It is also to be appreciated that the sliding window assembly 20 can be either a manual sliding assembly 20 or a power sliding window assembly 20.

With additional reference to FIGS. 2 and 3, the sliding window assembly 20 includes a first fixed panel 24 and a second fixed panel 26. The second fixed panel 26 is spaced a distance D from the first fixed panel 24 to define an aperture 28 between the fixed panels 24, 26. The first and second fixed panels 24, 26 are typically formed of glass. However, it is to be appreciated that the first and second fixed panels 24, 26 may be formed from plastic, metal, or any other material. The first and second fixed panels 24, 26 each present an interior surface 30 facing an interior of the vehicle 22, i.e., a passenger compartment, when the sliding window assembly 20 is coupled to the vehicle 22. Additionally, the first and second fixed panels 24, 26 each have an exterior surface 32 spaced from and opposite the interior surface 30 such that the exterior surface 32 faces an exterior of the vehicle 22 when the sliding window assembly 20 is coupled to the vehicle 22. The first and second fixed panels 24, 26 each further include an edge 34 extending between the interior surface 30 and the exterior surface 32 of the first and second fixed panels 24, 26.

The sliding window assembly 20 further includes a sliding panel 36. The sliding panel 36 is movable relative to the first and second fixed panels 24, 26 between an open position, an intermediate position, and a closed position. The sliding panel 36 completely covers the aperture 28 when the sliding panel 36 is in the closed position as shown in FIGS. 1, 2, and 9. The sliding panel 36 is in the open position when the aperture 28 is substantially uncovered by the sliding panel 36. The sliding panel 36 is in the intermediate position when the aperture 28 is partially covered by the sliding panel 36, as best shown in FIG. 3. In other words, the sliding panel 36 is in the intermediate position as the sliding panel 36 moves between the open and closed positions. The sliding panel 36 typically moves horizontally relative to the first and second fixed panels 24, 26. However, it is to be appreciated that the sliding panel 36 can move in any other direction, such as vertically. It is also to be appreciated that the sliding panel 36 is movable between the open and closed positions, either manually or automatically.

With reference to FIGS. 4-7, the sliding panel 36 has an interior surface 38 facing the interior of the vehicle 22 when the sliding window assembly 20 is coupled to the vehicle 22. Further, the sliding panel 36 has an exterior surface 40 spaced from and opposite the interior surface 38 of the sliding panel 36 such that the exterior surface 40 of the sliding panel 36 faces the exterior of the vehicle 22 when the sliding window assembly 20 is coupled to the vehicle 22. The sliding panel 36 is off-set from the first and second fixed panels 24, 26, such that the interior surface 30 of the first and second fixed panels 24, 26 faces and is adjacent to the exterior surface 40 of the sliding panel 36. Typically, the sliding panel 36 is in an off-set relationship with the fixed panels 24, 26, as best shown in FIG. 9. In other words, the sliding panel 36 is not in-line with the fixed panels 24, 26, such that the exterior surface 40 of the sliding panel 36 is in a different plane than the exterior surface 32 of each of the fixed panels 24, 26. The sliding panel 36 is also typically formed of glass. However, it is to be appreciated that the sliding panel 36 may be formed from plastic, metal, or any other material. The sliding panel 36 includes a bottom end 42 and a top end 44 spaced from the bottom end 42. The sliding panel 36 defines a generally rectangular configuration. However, it is to be appreciated that the sliding panel 36 may define other configurations.

The sliding window assembly 20 further includes at least one track 50, which is also commonly referred to throughout the industry as a run channel. Typically, the track 50 is coupled to the first and second fixed panels 24, 26. It is to be appreciated that the sliding panel 36 moves along the track 50 between the open, closed, and intermediate positions. The track 50 may be further defined as a lower track 50A and an upper track 50B. The lower and upper tracks 50A, 50B are typically spaced and substantially parallel to one another such that the sliding panel 36 moves horizontally between the open and closed positions relative to the first and second fixed panels 24, 26. It is to be appreciated that the lower and upper tracks 50A, 50B may be positioned in any other orientation; for example, the tracks 50A, 50B may be vertically spaced such that the sliding panel 36 may move vertically between the open and closed positions relative to the first and second fixed panels 24, 26. The lower track 50A and the upper track 50B are substantially similar to one another and are typically in a mirrored relationship to each other. Generally, the lower track 50A receives the bottom end 42 of the sliding panel 36 and the upper track 50B receives the top end 44 of the sliding panel 36.

With reference to FIGS. 3, 10, and 11, the track 50 includes a central section 46 with the central section 46 spanning the aperture 28. The track 50 further includes a pair of peripheral sections 48 spaced from one another with the central section 46 disposed between the peripheral sections 48. As best shown in FIG. 8, the central section 46 defines a notch 64 having a width W. The width W is substantially equal to or greater than the distance D between the first and second fixed panels 24, 26. Said differently, the width W of the notch 64 may be greater than, equal to, or less than the distance D between the fixed panels 24, 26. For example, the width W of the notch 64 may be less than the distance D by such a small margin as to appear to be equal to the distance D when the sliding window assembly 20 is viewed from the exterior of the vehicle. Said differently, the width W of the notch 64 is typically within of from about one inch, more typically within of from about one half of an inch, and even more typically within of from about one quarter of an inch of the distance D between the fixed panels 24, 26. In other words, the notch 64 may be shorter than the distance D and still be acceptable. The notch 64 is typically centered between the fixed panels 24, 26.

The notch 64 also eliminates the need for additional decorative elements, such as appliqués, for covering the lower and/or upper tracks 50A, 50B thereby providing a more aesthetically pleasing appearance when viewed from the exterior of the vehicle 22. Said differently, the notch 64 enables the sliding window assembly 20 to have an appearance of a common glass height between the fixed panels 24, 26 and the sliding panel 36 by maximizing the amount of the sliding panel 36 visible from the exterior of the vehicle 22. Said differently, style lines of the sliding panel 36 are aligned with style lines of the fixed panels 24, 26 such that the stile lines are smooth and continuous between the fixed panels 24, 26 and the sliding panel 36. Because there are no decorative elements required to cover the track 50, more of the sliding panel 36 is visible from the exterior of the vehicle.

The sliding panel 36 has a visible height HV when the sliding panel 36 is disposed between the fixed panels 24, 26 with the visible height HV of the sliding panel 36 substantially equal to a visible height HV of the fixed panels 24, 26 for providing the common glass height of the sliding window assembly 20 when viewed from the exterior of the vehicle 22.

In other words, when the sliding window assembly 20 is viewed from the exterior of the vehicle, the sliding panel 36 and the fixed panels 24, 26 each appear to have a height that is substantially equal to one another. The notch 64 in each of the lower track 50A and the upper track 50B allows the bottom end 42 and the top end 44 of the sliding panel 36 to be revealed, such that the height of the first and second fixed panels 24, 26 appears to be substantially equal to the height of the sliding panel 36.

The track 50 includes a base portion 52 having an inner end 54 and an outer end 56 spaced from the inner end 54. Generally, the inner end 54 is proximal the interior of the vehicle 22 and the outer end 56 is distal the interior of the vehicle 22. The track 50 further includes an inner leg 58 and an outer leg 60 spaced from one another and extending from the base portion 52 to define a channel 62 of the track 50. Specifically, the inner leg 58 may be coupled to the inner end 54 of the base portion 52 of the track 50 and extends away from the base portion 52 in a first direction, such that the inner leg 58 is substantially perpendicular to the base portion 52. The outer leg 60 may be coupled to the outer end 56 of the base portion 52 of the track 50 and also extends away from the base portion 52 in the first direction, such that the outer leg 60 is substantially perpendicular to the base portion 52 and substantially parallel to the inner leg 58. The base portion 52, the inner leg 58, and the outer leg 60 together define the channel 62 of the track 50. The track 50 has a first end 51 and a second end 53 spaced from the first end 51 with an entire length of the track 50 defined between the first end 51 and the second end 53. The channel 62 spans the entire length of the track 50 for accepting the sliding panel 36 therein and guiding the sliding panel 36 between the open and closed positions. Generally, the sliding panel 36 is secured between the inner leg 58 and the outer leg 60 of the track 50, whether the sliding panel 36 is in the open position, the closed position, or the intermediate position. In other words, the sliding panel 36 remains in the channel 62 defined by the track 50. As such, the channel 62 retains the sliding panel 36 within the track 50 as the sliding panel 36 moves between the open and closed positions.

With reference to FIGS. 5, 7, 10 and 11, the outer leg 60 of the track 50 defines the notch 64 for revealing the top end 42 or bottom end 44 of the sliding panel 36, when the sliding panel 36 is in the intermediate position or in the closed position. Said differently, a portion of the outer leg 60 within the central section 46 is removed thereby defining the notch 64 to uncover and make visible one of the top and bottom ends 42, 44 of the sliding panel 36 when the sliding window assembly 20 is viewed from the exterior of the vehicle 22.

Figure 5:
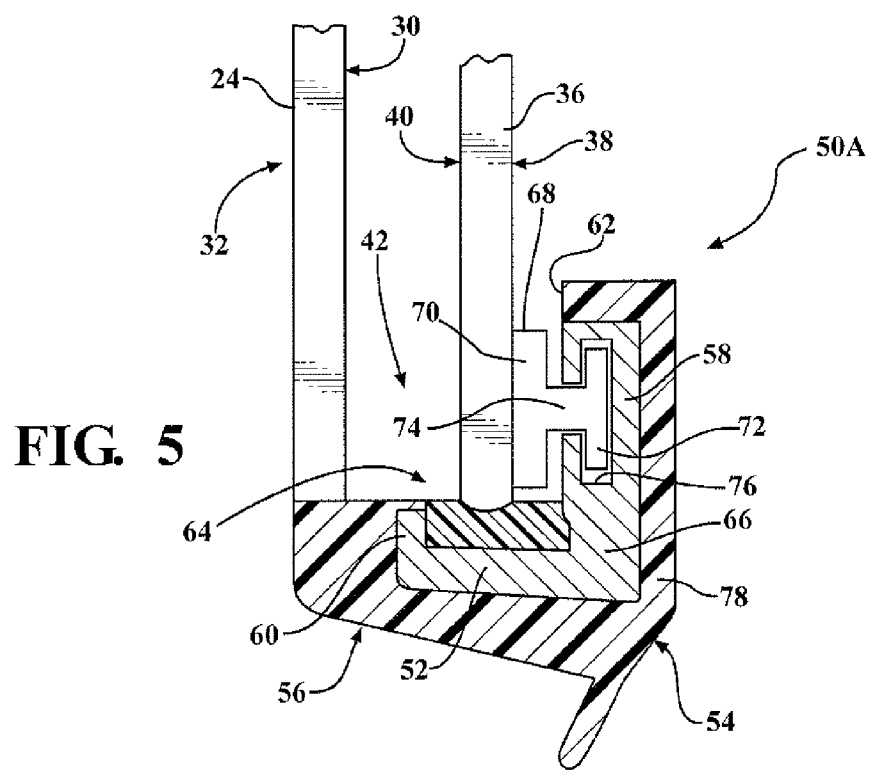
FIG. 5 is a cross-sectional view of a portion of the lower track of the sliding window assembly taken along line 5-5 of FIG. 3.
Figure 7:
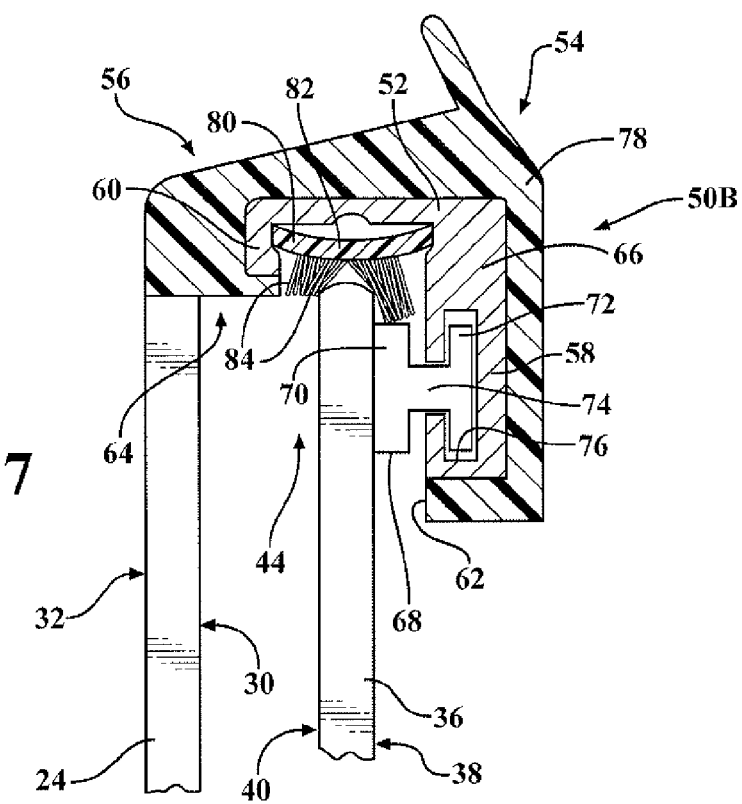
FIG. 7 is a cross-sectional view of a portion of the upper track of the sliding window assembly taken along line 7-7 of FIG. 3.

At the notch 64 a height of the outer leg 60 may be shortened, such that central section 46 of the track 50 defines a generally J-shaped cross-sectional configuration, as shown in FIGS. 5, 7, and 10. The shortened outer leg 60 provides rigidity to the track 50 while allowing the bottom end 42 and/or the top end 44 of the sliding panel 36 to be revealed when the sliding panel 36 at least partially obstructs the aperture 28. Alternatively, the outer leg 60 may be completely removed from the base portion 52 to define the notch 64, such that the central section 46 of the track 50 defines an L-shaped cross-sectional configuration at the notch 64, as shown in FIG. 11. It is to be appreciated that the channel 62 spans the track 50, although the cross-sectional configuration may vary along the entire length of the track 50. For example, the track may define a U-shaped cross-sectional configuration at each of the peripheral sections 48 and further define the J-shaped cross-sectional configuration at the central section 46, between the peripheral sections 48. Alternatively, the track may define the U-shaped cross-sectional configuration at each of the peripheral sections 48 and further define the L-shaped cross-sectional configuration at the central section 46, between the peripheral sections 48. It is the transition from the U-shaped cross-sectional configuration to either the J-shaped or L-shaped cross-sectional configuration that allows the bottom end 42 or top end 44 of the sliding panel 36 disposed in the channel 62 to be visible from the exterior of the vehicle 22.

With reference to FIGS. 4-7, the track 50 may be further defined as an elongated member 78 and a rail 66 disposed within the elongated member 78 with the rail 66 defining the channel 62 of the track 50. The rail 66 typically comprises a rigid material. Typically the rigid material is a metallic material, specifically a metallic alloy, such as an aluminum alloys or iron alloys. However, it is to be appreciated that the track 50 may be formed of any other rigid material, such as a polymeric material without deviating from the scope of the present disclosure. The elongated member 78 is typically a polymeric material formed by an encapsulation process, as will be described in greater detail below. Alternatively, the elongated member 78 may comprise a plurality of polymeric members adapted to be coupled to one another for enclosing the rail 66 therein. When employed, the rail 66 and the elongated member 78 each have inner and outer walls. The outer walls of the rail 66 and the elongated member 78 are the outer leg 60 of the track 50 and the inner walls of the rail 66 and the elongated member 78 are the inner leg 58 of the track 50. As such, the outer walls define the notch 64 of the track 50 when the rail 66 and the elongated member 78 are employed. It is to be appreciated that only one of the rail 66 or the elongated member 78 may be employed. In such a case, the rail 66 or the elongated member 78 would be the track 50 and the outer wall of the employed rail 66 or elongated member 78 would define the notch 64.

With continued reference to FIGS. 4-7, the inner leg 58 of the track 50 defines a groove 76. The groove 76 is spaced from the base portion 52. The groove 76 typically spans the entire length of the track 50. Alternatively, the groove 76 may only span a portion of the track 50. For example, the groove 76 may be aligned with the notch 64 defined by the outer leg 60 with the groove 76 not extending beyond the notch 64. The groove 76 typically defines a generally C-shaped configuration. However, it is to be appreciated that the groove 76 is not limited to the C-shaped configuration and may define any other appropriate configuration.

With additional reference to FIG. 8, at least one guide member 68 is disposed on the sliding panel 36. The guide member 68 is configured to engage the groove 76 for securing the sliding panel 36 within the channel 62 and guiding the sliding panel 36 between the open and closed positions. The guide member 68 includes a foundation 70 and an engagement portion 72 spaced from the foundation 70. A link portion 74 couples the foundation 70 and the engagement portion 72 to one another. The foundation 70 is fixedly secured to the sliding panel 36. The foundation 70 may be secured to the sliding panel 36 using an adhesive or any other appropriate method of attachment.

The engagement portion 72 has a complementary configuration to the groove 76. The at least one guide member 68 may be further defined as a plurality of guide members 68. One of the guide members 68 may be coupled to the sliding panel 36 adjacent the bottom end 42 and another of the guide members 68 may be coupled to the sliding panel 36 adjacent the top end 44 of the sliding panel 36. The guide members 68 may cover a portion of the bottom and top ends 42, 44. Alternatively, the guide members 68 may span the entire bottom end 42 and/or top end 44 respectively. Additionally, the sliding panel 36 remains secured within the channel 62 defined by lower and upper tracks 50A, 50B at all times. Even if any of the guide members 60A, 60B were to separate from the sliding panel 36, the sliding panel 36 will remain secured within the lower and upper tracks 50A, 50B and the sliding panel 36 will not fall into the interior of the vehicle 22 because the sliding panel 36 cannot bypass the inner leg of the U-shaped cross-sectional configuration of the peripheral sections 48 of the tracks 50A, 50B, regardless of the position of the sliding panel 36.

As introduced above, the track 50, and more specifically the lower and upper tracks 50A, 50B, are coupled to the first and second fixed panels 24, 26. Specifically, the outer leg 60 of each of the tracks 50A, 50B are coupled to the first and second fixed panels 24, 26. The tracks 50A, 50B may be coupled to the first and second fixed panels 24, 26 using any suitable method, such as encapsulation, molding, bonding, gluing, etc. It is to be appreciated that any other method of coupling the track 50 to the first and second fixed panels 24, 26 may also be employed. Generally, encapsulation results in an encapsulant 78 that may be used to couple the track 50 to the first and second fixed panels 24, 26. Encapsulation is also commonly referred to as adhesive surface bonding. In addition, encapsulation can be further defined as single-sided, two-sided, or three-sided encapsulation. For example, with single-sided encapsulation the track 50 is coupled to the interior surface 30 of each of the first and second fixed panels 24, 26 leaving the edge 34 and the exterior surface 32 of the first and second fixed panels 24, 26 free of encapsulant 78. Alternatively, with two-sided encapsulation, the track 50 is also coupled to the interior surface 30 of each of the first and second fixed panels 24, 26, with the encapsulant 78 being disposed on a portion of the interior surface 30 of the first and second fixed panels 24, 26 and on a portion of the edge 34 of the first and second fixed panels for coupling the track 50 to the first and second fixed panels 24, 26 and leaving the exterior surface 32 of the first and second fixed panels 24, 26 free of encapsulant 78. In yet another alternative, with three-sided encapsulation, the encapsulant 78 is disposed on a portion of the interior surface 30 of the first and second fixed panels 24, 26, a portion of the edge 34 of the first and second fixed panels 24, 26, and a portion of the exterior surface 32 of the first and second fixed panels 24, 26 for coupling the track 50 to the first and second fixed panels 24, 26. It should be appreciated that encapsulation can be any type of surface bonding for coupling the track 50 to the first and second fixed panels 24, 26.

The encapsulant 78 is typically formed of a plastic material and more typically, a thermoplastic material and/or a thermoset material. Even more typically, the plastic material is polyvinyl chloride (PVC). It is to be appreciated that the encapsulant 78 can be formed from various plastic materials, for example, thermoplastic elastomers (TPE); elastomeric alloys, e.g., thermoplastic valcanizates (TPV); thermoplastic polyolefins (TPO); thermoplastic styrene (TPS); various types of reaction injection molding (RIM) materials; and any other suitable material for encapsulation.

Figure 4:
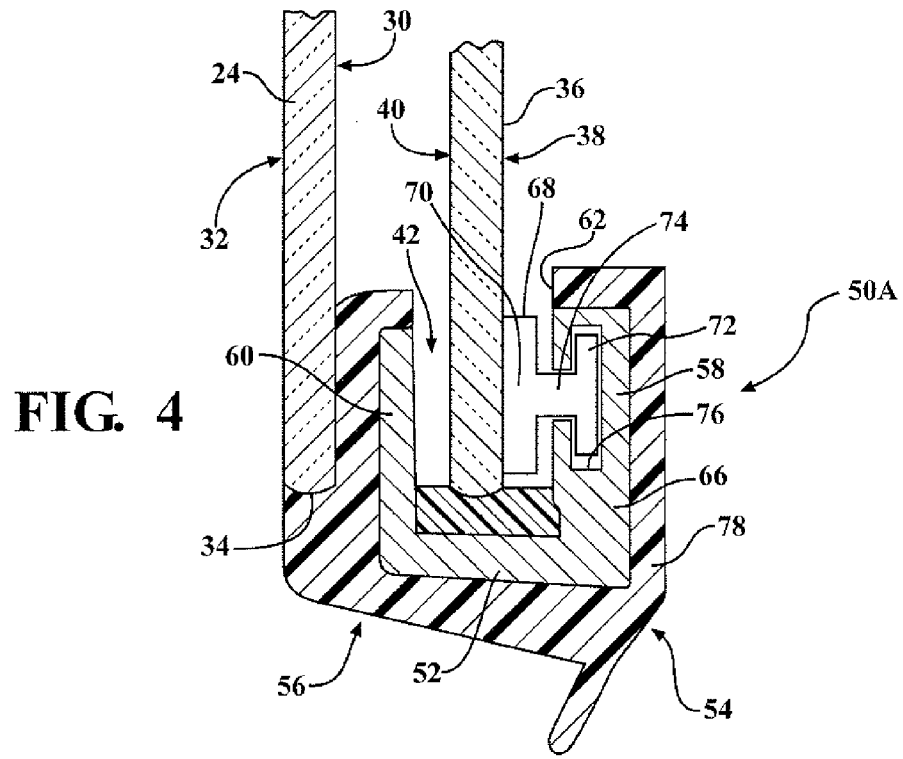
FIG. 4 is a cross-sectional view of a portion of a lower track of the sliding window assembly taken along line 4-4 of FIG. 3.

Preferably, a two-sided or a three-sided encapsulation is utilized to couple the track 50 to the first and second fixed panels 24, 26. As introduced above, the visible height HV may be different than the height of the first and second fixed panels 24, 26 because a portion of the first and second fixed panels 24, 26 may be embedded within the encapsulant 78, such as the edge 34 with the two-sided encapsulation as shown in FIGS. 4 and 6.

Figure 6:
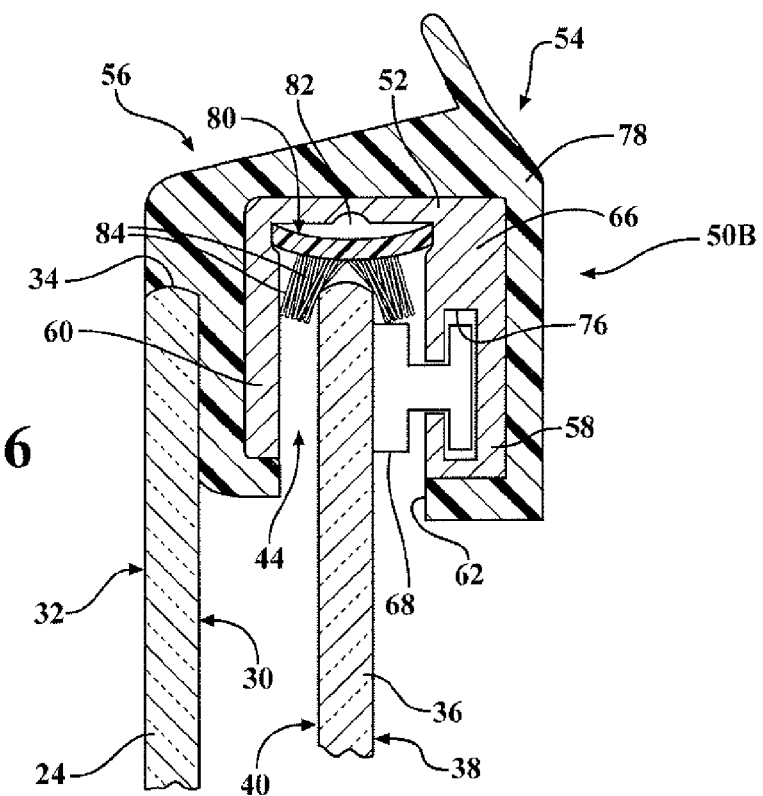
FIG. 6 is a cross-sectional view of a portion of an upper track of the sliding window assembly taken along line 6-6 of FIG. 3.

With reference to FIGS. 6 and 7, the sliding window assembly 20 may further include a sealing member 80. The sealing member may be further defined as a brush seal 80. The brush seal 80 is typically disposed within the upper track 50B. The brush seal 80 includes a support 82 and a plurality of bristles 84 extending from the support 82. The bristles 84 reduce friction between the sliding panel 36 and the upper track 50B as the sliding panel 36 moves between the open and closed positions. Additionally, the bristles 84 help to reduce rattling and unwanted movement of the sliding panel 28 thereby quieting the operation of the sliding window assembly 20. It is to be appreciated that the brush seal 80 may also be utilized in the lower track 50A as well. Alternatively, the sealing member 80 may be an elastomeric material or any other material that will prevent intrusion of foreign matter between the sliding panel 36 and the track 50.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention can be practiced otherwise than as specifically described.

What is claimed is:

1. A sliding window assembly for a vehicle, said sliding window assembly comprising:
   a first fixed panel;
   a second fixed panel spaced a distance from said first fixed panel to define an aperture between said first and second fixed panels;
   a sliding panel including a top end and a bottom end spaced from said top end with said sliding panel movable relative to said fixed panels between a closed position for covering said aperture and an open position for uncovering said aperture; and
   a track coupled to said fixed panels with a central section of said track spanning said aperture and with said track defining a channel for receiving either said top end or said bottom end of said sliding panel;
   wherein said central section of said track defines a notch having a width substantially equal to or greater than said distance between said first and second fixed panels for revealing either said top end or said bottom end of said sliding panel within said channel of said track between said first and second fixed panels;
   wherein said track includes a base portion, an inner leg, and an outer leg with said legs spaced from one another and with each of said legs extending from said base portion such that said base portion, said inner leg, and said outer leg define said channel of said track, and
   wherein said track is further defined as an elongated member and a rail disposed within said elongated member with said rail defining said channel of said track and with both of said elongated member and said rail defining said notch.

2. The sliding window assembly as set forth in claim 1 wherein said outer leg of said track is coupled to said fixed panels and defines said notch between said fixed panels.

3. The sliding window assembly as set forth in claim 2 wherein said inner leg of said track defines a groove and said outer leg of said track defines said notch between said fixed panels.

4. The sliding window assembly as set forth in claim 3 further including at least one guide member coupled to said sliding panel with said guide member adapted to engage said groove of said inner leg.

5. The sliding window assembly as set forth in claim 1 wherein said elongated member is an encapsulant comprising a polymeric material.

6. The sliding window assembly as set forth in claim 1 wherein said track has a first end and a second end spaced from said first end with an entire length of said track defined between said first end and said second end.

7. The sliding window assembly as set forth in claim 6 wherein said inner leg extends continuously between said first end and said second end along said entire length of said track and wherein said outer leg is broken along said entire length of said track for defining said notch.

8. The sliding window assembly as set forth in claim 1 wherein said inner and outer legs extend substantially perpendicular to said base portion.

9. The sliding window assembly as set forth in claim 1 wherein said track further includes a pair of peripheral sections spaced from one another on either side of said central section with said central section is defined between said fixed panels.

10. The sliding window assembly as set forth in claim 9 wherein said rail defines a generally U-shaped cross-sectional configuration within said peripheral sections of said rail.

11. The sliding window assembly as set forth in claim 10 wherein said track defines a generally L-shaped cross-sectional configuration within said central section such that said inner leg is completely removed for defining said notch.

12. The sliding window assembly as set forth in claim 10 wherein said track defines a generally J-shaped cross-sectional configuration within said central section such that said outer leg is shortened within said central section for defining said notch.

13. The sliding window assembly as set forth in claim 1 wherein said track is further defined as a lower track and an upper track with said upper track spaced from said lower track such that said sliding panel is disposed between said lower and upper tracks.

14. The sliding window assembly as set forth in claim 1 wherein said sliding panel has a visible height when disposed between said fixed panels with said visible height of said sliding panel substantially equal to a visible height of said fixed panels for providing a common glass height appearance of said sliding window assembly when viewed from an exterior of said vehicle.

15. The sliding window assembly as set forth in claim 1 further including a sealing member disposed adjacent said sliding panel for preventing intrusion of foreign matter between said sliding panel and said track.

16. The sliding window assembly as set forth in claim 1 wherein said width of said notch is less than said distance between said first and second fixed panels wherein said width of said notch is within of from about one inch of said distance between said fixed panels.

17. A sliding window assembly for a vehicle, said sliding window assembly comprising:
   a first fixed panel;
   a second fixed panel spaced a distance from said first fixed panel to define an aperture between said first and second fixed panels;
   a sliding panel including a top end and a bottom end spaced from said top end with said sliding panel movable relative to said fixed panels between a closed position for covering said aperture and an open position for uncovering said aperture; and
   a track coupled to said fixed panels with a central section of said track spanning said aperture and with said track defining a channel for receiving either said top end or said bottom end of said sliding panel;
   wherein said central section of said track defines a notch having a width substantially equal to or greater than said distance between said first and second fixed panels for revealing either said top end or said bottom end of said sliding panel within said channel of said track between said first and second fixed panels;

wherein said track includes a base portion, an inner leg, and an outer leg with said legs spaced from one another and with each of said legs extending from said base portion such that said base portion, said inner leg, and said outer leg define said channel of said track;

wherein said outer leg of said track is coupled to said fixed panels and defines said notch between said fixed panels and said inner leg of said track defines a groove with at least one guide member coupled to said sliding panel with said guide member adapted to engage said groove of said inner leg.

* * * * *